United States Patent
Maruyama et al.

(10) Patent No.: US 9,420,242 B2
(45) Date of Patent: Aug. 16, 2016

(54) IMAGING DEVICE AND EXPOSURE ADJUSTING METHOD

(71) Applicants: Go Maruyama, Kanagawa (JP); Kensuke Masuda, Kanagawa (JP); Yuji Yamanaka, Kanagawa (JP); Sho Nagai, Kanagawa (JP)

(72) Inventors: Go Maruyama, Kanagawa (JP); Kensuke Masuda, Kanagawa (JP); Yuji Yamanaka, Kanagawa (JP); Sho Nagai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/695,300

(22) Filed: Apr. 24, 2015

(65) Prior Publication Data

US 2015/0326771 A1   Nov. 12, 2015

(30) Foreign Application Priority Data

May 7, 2014 (JP) .................................. 2014-096257
Feb. 26, 2015 (JP) .................................. 2015-037421

(51) Int. Cl.
| | |
|---|---|
| *H04N 5/353* | (2011.01) |
| *H04N 9/04* | (2006.01) |
| *H04N 5/235* | (2006.01) |
| *H04N 9/083* | (2006.01) |
| *H04N 5/225* | (2006.01) |

(52) U.S. Cl.
CPC ............ *H04N 9/045* (2013.01); *H04N 5/2254* (2013.01); *H04N 5/2351* (2013.01); *H04N 5/2353* (2013.01); *H04N 9/083* (2013.01)

(58) Field of Classification Search
CPC ... H04N 5/2353; H04N 5/353; H04N 5/2351; H04N 9/083
See application file for complete search history.

(56) References Cited

U.S. PATENT DOCUMENTS

| | | |
|---|---|---|
| 5,717,605 A | 2/1998 | Komiya et al. |
| 6,269,182 B1 | 7/2001 | Ishii |
| 7,999,861 B2 | 8/2011 | Kato |
| 8,143,565 B2 | 3/2012 | Berkner et al. |
| 2010/0201800 A1 | 8/2010 | Yamamoto et al. |
| 2014/0078379 A1* | 3/2014 | Masuda .................. H04N 9/045 348/360 |
| 2014/0098212 A1* | 4/2014 | Yamanaka ........... H04N 5/2254 348/79 |
| 2014/0152983 A1 | 6/2014 | Masuda et al. |
| 2014/0153775 A1 | 6/2014 | Maruyama et al. |
| 2014/0375994 A1* | 12/2014 | Yamanaka .............. G01J 3/513 356/402 |

FOREIGN PATENT DOCUMENTS

| | | |
|---|---|---|
| JP | 07-120324 | 5/1995 |
| JP | 2007-127657 | 5/2007 |
| JP | 2009-245429 | 10/2009 |
| JP | 2010-181833 | 8/2010 |
| JP | 2011-075562 | 4/2011 |
| JP | 2013-214950 | 10/2013 |

* cited by examiner

*Primary Examiner* — Tuan Ho
(74) *Attorney, Agent, or Firm* — Oblon, McClelland, Maier & Neustadt, L.L.P

(57) ABSTRACT

An imaging device includes a filter, an imaging element, a lens, a spectral image generator, and an exposure adjuster. The filter includes a plurality of filter areas having different spectral transmission characteristics. The imaging element receives light transmitted through the filter and outputs image information. The lens array includes a plurality of lenses arranged approximately parallel to a light receiving surface of the imaging element and is arranged between the filter and the imaging element. The spectral image generator generates a plurality of spectral images respectively corresponding to the plurality of filter areas on the basis of the image information output by the imaging element. The exposure adjuster adjusts an exposure time of the imaging element on the basis of luminance values of the spectral images.

20 Claims, 8 Drawing Sheets

IMAGING DEVICE AND EXPOSURE ADJUSTING METHOD

CROSS-REFERENCE TO RELATED APPLICATIONS

The present application claims priority to and incorporates by reference the entire contents of Japanese Patent Application No. 2014-096257 filed in Japan on May 7, 2014 and Japanese Patent Application No. 2015-037421 filed in Japan on Feb. 26, 2015.

BACKGROUND OF THE INVENTION

1. Field of the Invention

The present invention relates to an imaging device and an exposure adjusting method.

2. Description of the Related Art

Conventionally, there is known an imaging device that receives light from an object by spatially splitting the light into a plurality of light beams having different wavelength characteristics and outputs an image including a plurality of areas corresponding to the split light beams (for example, see Japanese Laid-open Patent Publication No. 2013-214950). In the imaging device disclosed in Japanese Laid-open Patent Publication No. 2013-214950, a filter including a plurality of filter areas having different spectral transmission characteristics is arranged at a stage prior to a microlens array in a configuration of a plenoptic camera. A light receiving element array (an imaging element) receives light serially transmitted through the filter and the microlens array, and outputs a light field image, in which partial images (hereinafter referred to as "macro pixels") corresponding to a plurality of microlenses of the microlens array are arranged.

Each of the macro pixels in the light field image has a plurality of image areas respectively corresponding to the plurality of filter areas of the filter. By obtaining, from the macro pixels, representative values of image areas corresponding to the same filter area and rearranging the representative values in accordance with the positions of the macro pixels, it is possible to generate a plurality of spectral images corresponding to the light beams transmitted through the filter areas. The spectral images may be used to detect a color of an object, for example.

In color detection using the spectral images, if the spectral images contain a pixel in a saturated state, detection accuracy is reduced. Further, a signal-to-noise ratio (S/N) of a pixel with a low luminance value is low; therefore, if each of the pixels of the spectral images do not have adequate luminance, it is difficult to stably detect colors. Therefore, there is a need to appropriately adjust exposure in capturing a light field image so as to enable to generate spectral images appropriate for detecting a color of an object.

As an exposure adjusting method for a multispectral camera, a method disclosed in Japanese Laid-open Patent Publication No. 2007-127657 is known, for example. In the method disclosed in Japanese Laid-open Patent Publication No. 2007-127657, when a reflection spectrum of an object is to be captured while switching among bandpass filters, preliminary exposure is performed to obtain an appropriate exposure time for each of the bandpass filters. Then, the exposure time is changed in synchronization with the switching among the bandpass filters, and imaging is performed with the appropriate exposure time for each of the bandpass filters.

However, in the conventional method of adjusting exposure of a camera, including the method disclosed in Japanese Laid-open Patent Publication No. 2007-127657, an adjustment is made so that exposure is appropriately performed on the entire sensor plane of the imaging element. Therefore, if the conventional exposure adjusting method is applied to an imaging device that generates spectral images from a light field image, exposure is adjusted for an area including an area that is not reflected in the spectral images. Therefore, it is difficult to appropriately adjust an exposure time of the imaging element so as to meet the above described conditions needed for the spectral images.

SUMMARY OF THE INVENTION

It is an object of the present invention to at least partially solve the problems in the conventional technology.

According to an embodiment, an imaging device includes a filter, an imaging element, a lens, a spectral image generator, and an exposure adjuster. The filter includes a plurality of filter areas having different spectral transmission characteristics. The imaging element receives light transmitted through the filter and outputs image information. The lens array includes a plurality of lenses arranged approximately parallel to a light receiving surface of the imaging element and is arranged between the filter and the imaging element. The spectral image generator generates a plurality of spectral images respectively corresponding to the plurality of filter areas on the basis of the image information output by the imaging element. The exposure adjuster adjusts an exposure time of the imaging element on the basis of luminance values of the spectral images.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments will be described in detail below with reference to the accompanying drawings.

Figure 1:
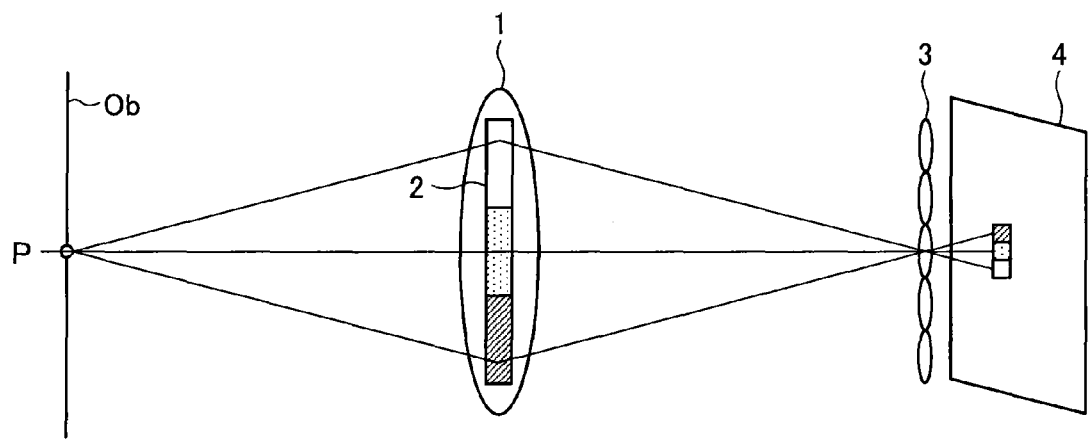
FIG. 1 is a conceptual diagram of an optical system in an imaging device of an embodiment.

FIG. 1 is a conceptual diagram of an optical system in an imaging device of an embodiment. In FIG. 1, for simplicity of explanation, a main lens 1 that functions as an imaging lens is illustrated as a single lens and a diaphragm position of the main lens 1 is assumed as the center of the single lens.

At the diaphragm position of the main lens 1, a filter 2 is arranged. In FIG. 1, the filter 2 is illustrated as if the filter 2 is arranged within the main lens 1 illustrated as a single lens; however, in reality, the filter 2 is not arranged in the inside of the lens.

The filter 2 includes a plurality of filter areas having different spectral transmission characteristics. In the embodiment, a color filter that deals with tristimulus values of colors with spectral transmittances based on a color-matching function of an XYZ color system defined by the International Commission on Illumination (CIE) is used for the filter 2.

Figure 2:
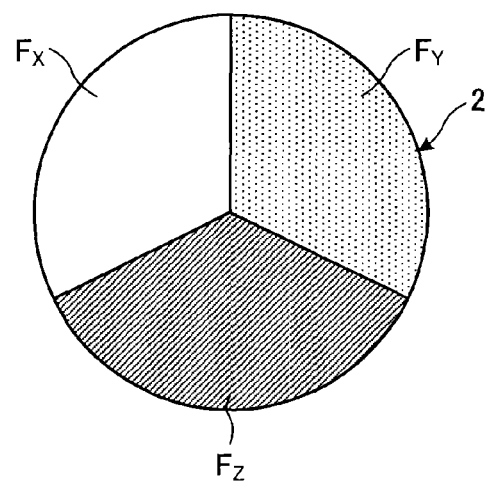
FIG. 2 is a diagram illustrating an example of a geometric design of a filter.

FIG. 2 is a diagram illustrating an example of a geometric design of the filter 2 of the embodiment. As illustrated in FIG. 2, the filter 2 of the embodiment includes three filter areas $F_X$, $F_Y$, and $F_Z$ designed based on the color-matching function of the XYZ color system. The filter 2 as described above may be fabricated by, for example, depositing a multi-layer film with predetermined characteristics on a transparent substrate (an optical glass or the like) in a thin-film form through vapor deposition.

Figure 3:
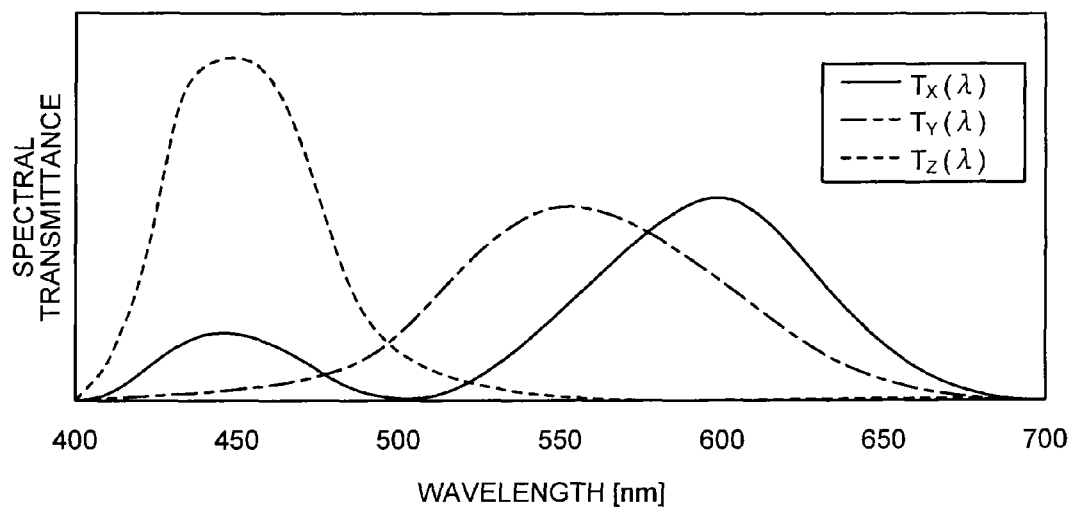
FIG. 3 is a diagram illustrating a spectral transmittance of the filter.

FIG. 3 is a diagram illustrating a spectral transmittance of the filter 2 of the embodiment. In FIG. 3, a solid line indicates a spectral transmittance $T_X(\lambda)$ of the filter area $F_X$, an alternate long and short dash line indicates a spectral transmittance $T_Y(\lambda)$ of the filter area $F_Y$, and a dash line indicates a spectral transmittance $T_Z(\lambda)$ of the filter area $F_Z$. The transmittances $T_X(\lambda)$, $T_Y(\lambda)$, and $T_Z(\lambda)$ are obtained by substituting the color-matching function of the XYZ color system with transmittances. As described above, the filter areas $F_X$, $F_Y$, and $F_Z$ of the filter 2 have different spectral transmission characteristics.

The configuration of the filter 2 is not limited to the example as described above. It is sufficient that the filter 2 includes a plurality of filter areas having different spectral transmission characteristics, and the number of the filter areas may be two, four, or more. Further, the boundaries of the filter areas need not be clearly distinguished, and may be configured such that the spectral transmittance continuously varies.

In the vicinity of a light condensing position of the main lens 1, a microlens array 3 (an example of a lens array) including a plurality of microlenses (small lenses) is arranged. Further, a light receiving element array 4 (an example of an imaging element) is arranged on an image plane of an optical system. The light receiving element array receives light transmitted through the filter 2 and the microlens array 3 and outputs image information. The light receiving element array 4 is a monochrome sensor on which a color filter for each pixel is not mounted, and each of light receiving elements corresponds to one of pixels of an image. A relation between a diameter of each of the microlenses of the microlens array 3 and a size of each of the light receiving elements of the light receiving element array 4 is represented by a ratio of about 30:1 to 10:1.

Figure 4:
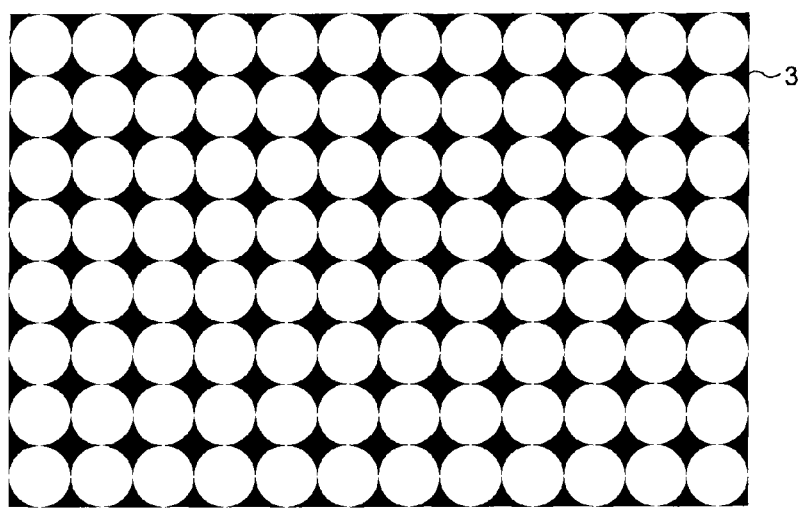
FIG. 4 is a plan view of a microlens array viewed from a direction along an optical axis.

FIG. 4 is a plan view of the microlens array 3 viewed from a direction along an optical axis P (see FIG. 1). A plurality of microlenses of the microlens array 3 is arranged approximately parallel to a light receiving surface of the light receiving element array 4. Areas between adjacent microlenses serve as light shielding portions. In FIG. 4, portions illustrated in white are the microlenses, and portions illustrated in black are the light shielding portions. The light shielding portions are flat portions that do not have curvatures, or areas in which curvatures do not meet design value specifications in a manufacturing aspect. Light from these areas may cause light beams that are not intended in design to reach the light receiving elements; therefore, the areas are shielded so that electrical signals expected based on the design can be obtained.

In the imaging device of the embodiment, a light bundle, which enters an aperture of the main lens 1 and passes through a diaphragm, in the light emitted from an object Ob is transmitted through the microlens array 3 and is received by the light receiving element array 4. The light bundle incident on the main lens 1 is a set of countless light beams, and respective light beams pass through different positions of the diaphragm of the main lens 1. In the imaging device of the embodiment, the filter 2 including the three filter areas $F_X$, $F_Y$, and $F_Z$ is arranged at the diaphragm position of the main lens 1. Therefore, the light beams that pass through different positions of the diaphragm of the main lens 1 are three kinds of light beams corresponding to the respective spectral transmission characteristics of the three filter areas $F_X$, $F_Y$, and $F_Z$.

The light beams transmitted through the filter 2 are once condensed in the vicinity of the microlens array 3 and then diffused by an action of the microlens array 3. Thereafter, the light beams transmitted through the three filter areas $F_X$, $F_Y$, and $F_Z$ of the filter 2 reach different positions of the light receiving element array 4. Specifically, the light beams transmitted through the diaphragm position of the main lens 1 differ in light reception positions on a sensor plane of the light receiving element array 4 depending on which of the three filter areas $F_X$, $F_Y$, and $F_Z$ of the filter 2 the light beams are transmitted through. Therefore, in the imaging device of the embodiment, it is possible to observe the light emitted from a certain single point of the object Ob by separating the light into tristimulus values X, Y, and Z in wavelength, and to measure spectral reflectances of the point. Note that, while only a single point of the object Ob on the optical axis P is illustrated in FIG. 1, the same applies to positions other than the position on the optical axis P, and it is possible to simultaneously measure two-dimensional spectral reflectances.

Figure 5:
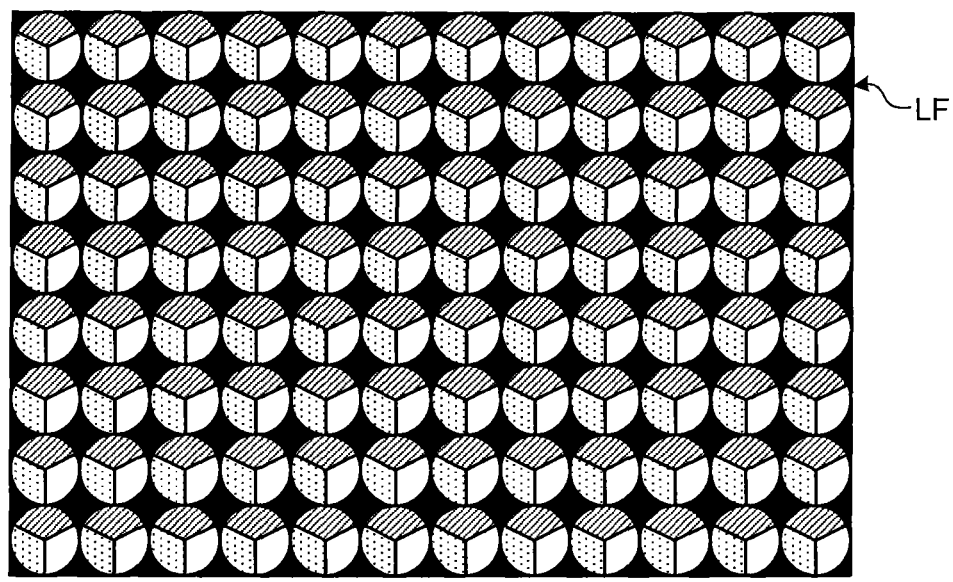
FIG. 5 is a diagram illustrating a light field image captured by the imaging device.

FIG. 5 is a diagram illustrating a light field image LF captured by the imaging device of the embodiment. When the imaging device of the embodiment captures an image, the light field image LF in which small circular partial images are arranged is obtained as illustrated in FIG. 5. The reason why each of the partial images included in the light field image LF has a circular shape is that the shape of the aperture of the main lens 1 is a circle. Each of the small circular partial images included in the light field image LF is referred to as a "macro pixel". Each of the macro pixels is formed immediately beneath each of the microlenses of the microlens array 3.

Figure 6:
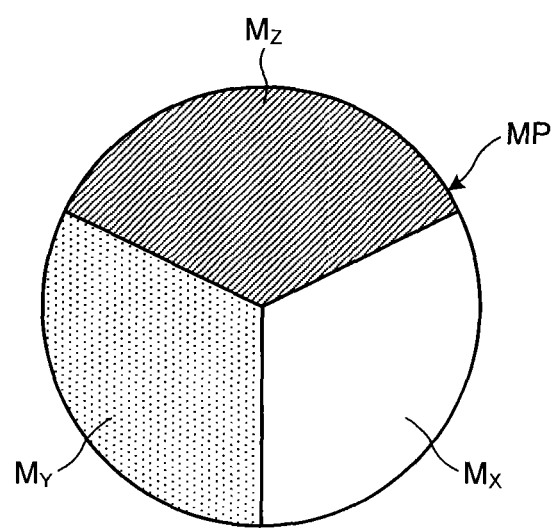
FIG. 6 is an enlarged view of a macro pixel.

FIG. 6 is an enlarged view of a macro pixel MP. An inner structure of the macro pixel MP corresponds to the structure of the filter 2 (see FIG. 2) arranged at the aperture position of the main lens 1. Specifically, as illustrated in FIG. 6, each of the macro pixels MP included in the light field image LF captured by the imaging device of the embodiment includes an image area $M_X$ corresponding to the filter area $F_X$ of the filter 2, an image area $M_Y$ corresponding to the filter area $F_Y$, and an image area $M_Z$ corresponding to the filter area $F_Z$. The image areas $M_X$, $N_Y$, and $M_Z$ in the macro pixel MP are obtained by receiving, by the light receiving element array 4, light beams transmitted through the respective filter areas $F_X$, $F_Y$, and $F_Z$ of the filter 2. The reason why the inner structure of the macro pixel MP illustrated in FIG. 6 is turned upside down as compared to the structure of the filter 2 illustrated in FIG. 2 is due to transmission through the optical system. However, the correspondence relation depends on the optical system, and is not limited to this example.

The imaging device of the embodiment has a function to generate spectral images (a multiband image) respectively corresponding to the three filter areas $F_X$, $F_Y$, and $F_Z$ of the filter 2 on the basis of the light field image LF as described above, and to detect a color of the object Ob by using the spectral images. Further, the imaging device of the embodiment has a function to adjust an exposure time of the light receiving element array 4 on the basis of luminance values of the generated spectral images. In the following, the imaging device of the embodiment having the above described functions will be described in detail.

Figure 7:
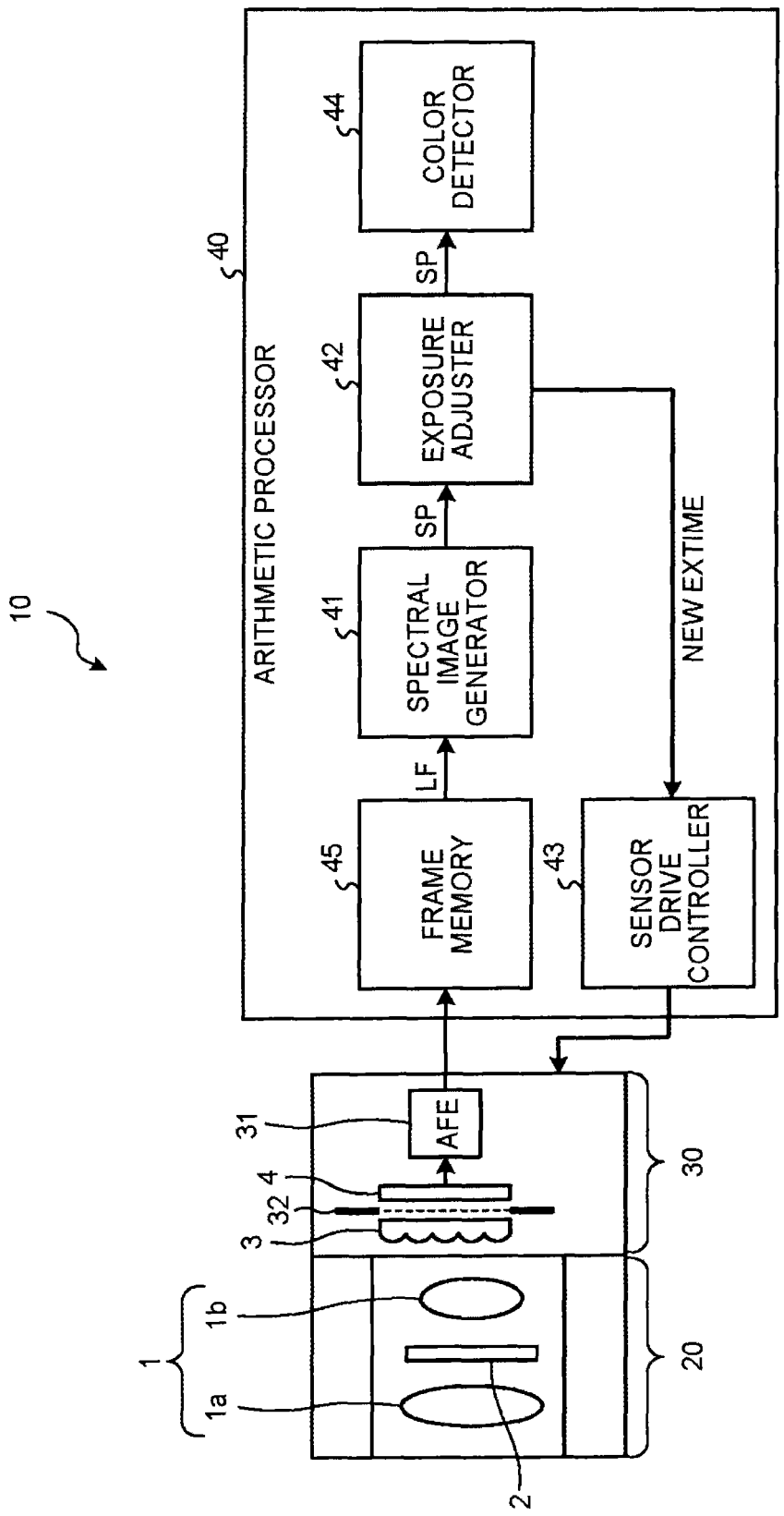
FIG. 7 is a block diagram illustrating a specific configuration example of the imaging device of the embodiment.

FIG. 7 is a diagram illustrating a specific configuration example of the imaging device of the embodiment. An imaging device 10 illustrated in FIG. 7 includes a lens module 20, a sensor 30, and an arithmetic processor 40.

The lens module 20 includes a first lens 1a, a second lens 1b, and the filter 2 as described above. The first lens 1a and the second lens 1b form the main lens 1 as described above. However, this configuration is an example, and any configuration may be applied as long as the filter 2 is arranged at a diaphragm position of an optical element of the main lens 1.

The sensor 30 includes the microlens array 3 as described above, the light receiving element array 4 as described above, an analog front end (AFE) 31, and a shutter 32. The AFE 31 performs gain adjustment or analog-to-digital (AD) conversion on image signals output by the light receiving element array 4, and outputs digital image information (a light field image). The shutter 32 restricts incidence of light to the light receiving element array 4. An exposure time of the imaging device 10 of the embodiment is controlled by controlling drive of the shutter 32 in accordance with control signals that are supplied from a sensor drive controller 43 (to be described later) to the sensor 30. Note that an example is illustrated in the embodiment in which the exposure time is controlled by using the mechanical shutter 32. Alternatively, it may be possible to control the exposure time by an electronic shutter or by a combination of the shutter 32 and the electronic shutter. Further, while the shutter 32 is arranged between the microlens array 3 and the light receiving element array 4 in FIG. 7, it is sufficient that the shutter 32 is arranged at a position where incidence of light to the light receiving element array 4 is controllable, and the position is not limited to the example illustrated in FIG. 7.

The arithmetic processor 40 performs processing on the light field image LF output from the sensor 30 and controls operation of the sensor 30. As illustrated in FIG. 7, the arithmetic processor 40 includes processing functions such as a spectral image generator 41, an exposure adjuster 42, the sensor drive controller 43, and a color detector 44. The arithmetic processor 40 further includes a frame memory 45 for temporarily storing the light field image LF output from the sensor 30.

The spectral image generator 41 generates spectral images respectively corresponding to the three filter areas $F_X$, $F_Y$, and $F_Z$ of the filter 2 on the basis of the light field image LF, which is output from the sensor 30 and is temporarily stored in the frame memory 45.

The spectral image is an image with a horizontal and vertical size equal to the number of the macro pixels of the light field image LF, and the position of each of the macro pixels in the light field image LF corresponds one-to-one to the coordinates of the spectral image. The number of the spectral images generated by the spectral image generator 41 corresponds to the number of the filter areas of the filter 2. In the embodiment, the filter 2 includes the three filter areas $F_X$, $F_Y$, and $F_Z$, so that three spectral images are generated. A set of the spectral images, where the spectral images serve as channels, is referred to as a "multiband image".

Figure 8A:
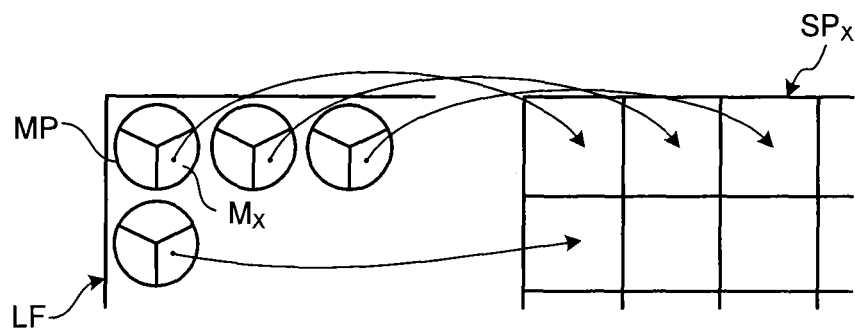
FIGS. 8A to 8C are diagrams schematically illustrating how spectral images are generated from a light field image.
Figure 8B:
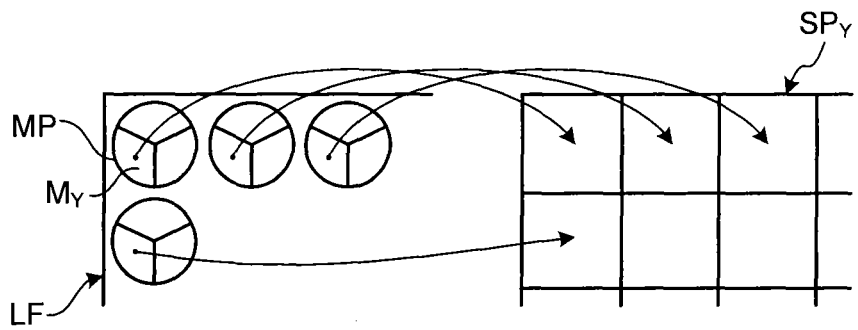
Figure 8C:
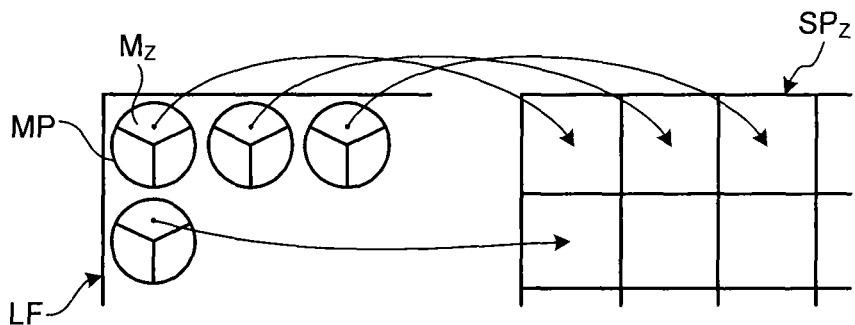

FIGS. 8A to 8C are diagrams schematically illustrating how spectral images are generated from the light field image LF. FIG. 8A illustrates how a spectral image $SP_X$ corresponding to the filter area $F_X$ of the filter 2 is generated, FIG. 8B illustrates how a spectral image $SP_Y$ corresponding to the filter area $F_Y$ of the filter 2 is generated, and FIG. 8C illustrates how a spectral image $SP_Z$ corresponding to the filter area $F_Z$ of the filter 2 is generated.

As illustrated in FIG. 8A, the spectral image $SP_X$ is generated in such a manner that a representative value of an image area $M_X$ of each of the macro pixels MP included in the light field image LF is rearranged as a pixel value at the coordinates corresponding to the position of the macro pixel MP on the light field image LF. Similarly, as illustrated in FIG. 8B, the spectral image $SP_Y$ is generated in such a manner that a representative value of an image area $M_Y$ of each of the macro pixels MP included in the light field image LF is rearranged as a pixel value at the coordinates corresponding to the position of the macro pixel MP on the light field image LF. Similarly, as illustrated in FIG. 8C, the spectral image $SP_X$ is generated in such a manner that a representative value of an image area $M_Z$ of each of the macro pixels MP included in the light field image LF is rearranged as a pixel value at the coordinates corresponding to the position of the macro pixel MP on the light field image LF.

Figure 9:
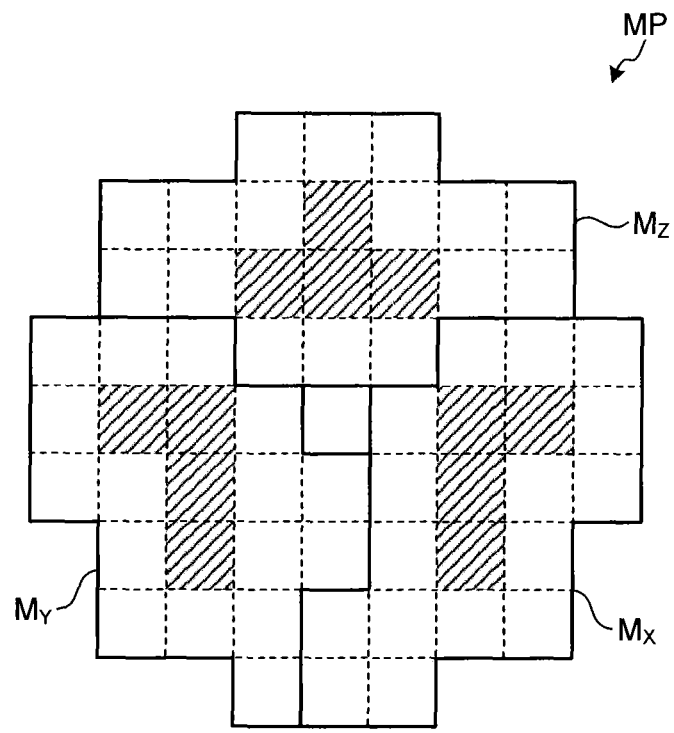
FIG. 9 is a diagram schematically illustrating a single macro pixel on the light field image.

FIG. 9 is a diagram schematically illustrating the single macro pixel MP on the light field image LF. Hatching in the figure indicates positions of pixels (hereinafter, referred to as "mezzo pixels") used to calculate the representative value of each of the image areas $M_X$, $M_Y$, and $M_Z$ of the macro pixel MP. The positions of the mezzo pixels are defined with respect to each of the macro pixels. In this example, the number of mezzo pixels in each of the image areas $M_X$, $M_Y$, and $M_Z$ of all of the macro pixels MP is set to four; however, the number is not limited to this example. The number of the mezzo pixels may vary for each of the macro pixels or vary for each of the image areas $M_X$, $M_Y$, and $M_Z$. Further, the positions of the mezzo pixels are not limited to the example illustrated in FIG. 9, and may be set in an arbitrary manner. However, in a general optical system, there is a tendency that the luminance value increases toward the center of the macro pixel MP and decreases toward the periphery. Therefore, it is preferable to use pixels in the vicinity of the center of each of the image areas $M_X$, $M_Y$, and $M_Z$ as the mezzo pixels.

The spectral image generator 41 is able to generate a multiband image having the spectral images $SP_X$, $SP_Y$, and $SP_Z$ as channels by a method as described below, for example. Specifically, the spectral image generator 41 repeats processing as described below on all of the macro pixels MP (i, j) included in the light field image LF where i is an index representing a lateral position in an image, and j is an index representing a vertical position in an image.

The spectral image generator 41 checks pixel values (luminance values) of the mezzo pixels of the image area $M_X$, and if there is a mezzo pixel whose pixel value is saturated, uses a saturation value as a representative value of the image area $M_X$. In contrast, if there is no mezzo pixel whose pixel value is saturated, an average value of the pixel values of the mezzo pixels is used as the representative value of the image area $M_X$. The spectral image generator 41 sets the obtained representative value of the image area $M_X$ as a pixel value of a pixel p (i, j) in the spectral image $SP_X$. The saturation value is a value corresponding to a saturation sensitivity of the light receiving element array 4, and indicates that the pixel is in a saturated state. The saturation value is 255 when an analog output of the light receiving element array 4 is handled by 8 bits, and 4096 when the analog output is handled by 12 bits.

The reason why the saturation value (a maximum luminance value) is used as the pixel value of the spectral image $SP_X$ when a saturated mezzo pixel is present is as follows. If an average pixel value obtained from values including the saturation value is used as the pixel value of the spectral image $SP_X$, an inaccurate value is included in the spectral image $SP_X$, and therefore, color detection accuracy may be reduced due to the error when the color detector 44 at a subsequent stage uses the spectral image $SP_X$ to detect a color of an object Ob.

Similarly, the spectral image generator 41 checks pixel values (luminance values) of the mezzo pixels of the image area $M_Y$, uses a saturation value as a representative value of the image area $M_Y$ if there is a mezzo pixel whose pixel value is saturated, and uses an average value of the pixel values of the mezzo pixels as the representative value of the image area $M_Y$ if there is no mezzo pixel whose pixel value is saturated. The spectral image generator 41 sets the obtained representative value of the image area $M_Y$ as a pixel value of a pixel p (i, j) in the spectral image $SP_Y$.

Similarly, the spectral image generator 41 checks pixel values (luminance values) of the mezzo pixels of the image area $M_Z$, uses a saturation value as a representative value of the image area $M_Z$ if there is a mezzo pixel whose pixel value is saturated, and uses an average value of the pixel values of the mezzo pixels as the representative value of the image area $M_Z$ if there is no mezzo pixel whose pixel value is saturated. The spectral image generator 41 sets the obtained representative value of the image area $M_Z$ as a pixel value of a pixel p (i, j) in the spectral image $SP_Z$.

By repetition of the above described processes on all of the macro pixels MP (i, j) included in the light field image LF, a multiband image including all of the spectral images $SP_X$, $SP_Y$, and $SP_Z$ as channels is generated. The multiband image (the spectral images $SP_X$, $SP_Y$, and $SP_Z$) generated by the spectral image generator 41 is sent to the exposure adjuster 42.

Referring back to FIG. 7, the exposure adjuster 42 determines whether an exposure time of the light receiving element array 4 is appropriate or not on the basis of the luminance values of the spectral images $SP_X$, $SP_Y$, and $SP_Z$ (hereinafter, may be collectively referred to as a spectral image SP when they need not be distinguished from one another) serving as the channels of the multiband image received from the spectral image generator 41. When determining that the exposure time is appropriate, the exposure adjuster 42 sends the multiband image received from the spectral image generator 41 to the color detector 44. In contrast, when determining that the exposure time is not appropriate, the exposure adjuster 42 calculates a new exposure time and sends the new exposure time to the sensor drive controller 43. Note that, even when it is determined that the exposure time is not appropriate (the exposure time is short), if a current exposure time has reached a predetermined upper limit, the multiband image received from the spectral image generator 41 is sent to the color detector 44 because it is impossible to increase the exposure time. Alternatively, it may be possible to notify a user that appropriate color detection is impossible because of inadequate light.

Figure 10:
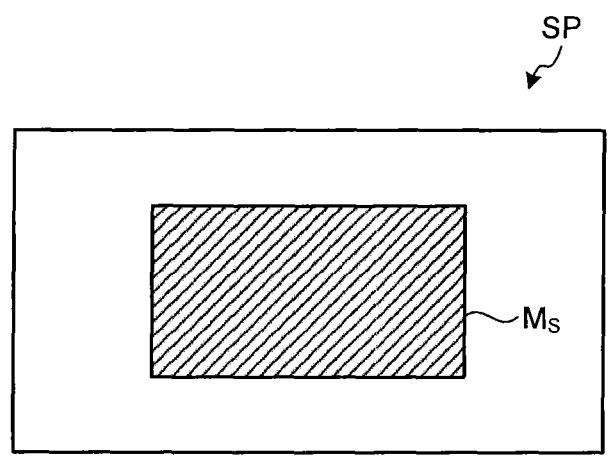
FIG. 10 is a diagram illustrating an example of a specific image area of a spectral image.

A specific example of processing performed by the exposure adjuster 42 will be described below. The exposure adjuster 42 first acquires a pixel value (luminance value) of a pixel having the maximum luminance in a specific image area $M_S$ of the spectral image SP. In the embodiment, because the multiband image includes the spectral images $SP_X$, $SP_Y$, and $SP_Z$ of the three channels, the exposure adjuster 42 acquires a pixel value (luminance value) of a pixel having the maximum luminance among the three channels. As illustrated in FIG. 10 for example, the specific image area $M_S$ may be determined in advance as an area with a predetermined size in the center of the spectral image SP.

Subsequently, the exposure adjuster 42 compares the luminance value acquired from the spectral image SP with an upper limit and a lower limit of a predetermined range that is set based on the above described saturation value. If the luminance value acquired from the spectral image SP falls within the predetermined range, it is determined that the exposure time of the light receiving element array 4 is appropriate, and the multiband image received from the spectral image generator 41 is sent to the color detector 44. It is preferable to set the predetermined range to a range of 80% to 90% of the saturation value (equal to or higher than 80 percent of the saturation value and equal to or lower than 90 percent of the saturation value), for example. This is because, in an experiment for evaluating color detection accuracy while changing the exposure time of the light receiving element array 4, it is confirmed that by adjusting the exposure time of the light receiving element array 4 such that the maximum luminance value of the spectral image SP falls within a range of 80% to 90% of the saturation value, an S/N of the spectral image SP can be improved, saturation of pixels can be prevented, and color detection using the spectral image SP can be performed with high accuracy.

Further, if the luminance value acquired from the spectral image SP does not fall within the predetermined range, the exposure adjuster 42 calculates a new exposure time such that the luminance value falls within the predetermined range as described below. Specifically, the exposure adjuster 42 calculates a new exposure time New Extime by Equation (1) below, where val is the luminance value acquired from the spectral image SP, Maxval is a saturation value, Current Extime is a current exposure time, and New Extime is a new exposure time.

$$\text{New Extime} = (\text{Current Extime}) \times (\text{Maxval} \times (0.9+0.8)/2/\text{val}) \quad (1)$$

The exposure adjuster 42 sends the new exposure time New Extime calculated as described above to the sensor drive controller 43. As described above, if the current exposure time Current Extime has reached a predetermined upper limit, and the luminance value acquired from the spectral image SP is lower than 80% of the saturation value, the new exposure time New Extime is not calculated and an adjustment of the exposure time is terminated.

The sensor drive controller 43 supplies a control signal containing the exposure time to the sensor 30, and controls imaging of the light field image LD by the sensor 30. When the exposure adjuster 42 calculates a new exposure time, the sensor drive controller 43 supplies a control signal containing the new exposure time to the sensor 30. Consequently, the exposure time of the light receiving element array 4 is adjusted such that the luminance value of the spectral image SP generated by the spectral image generator 41 falls within the predetermined range. The spectral image SP (multiband image), which is generated by the spectral image generator 41 on the basis of the light field image LF obtained by driving the light receiving element array 4 with an appropriate exposure time, is sent to the color detector 44. The exposure adjuster 42 may re-determine whether the exposure time is appropriate or not with respect to the spectral image SP (multiband image) generated after the adjustment of the exposure time, may repeat the adjustment of the exposure time until the exposure time is determined as an appropriate time, and may send the spectral image SP to the color detector 44 upon determining that the exposure time is appropriate.

The color detector 44 detects a color of the object Ob by using the multiband image sent from the exposure adjuster 42. The spectral images $SP_X$, $SP_Y$, and $SP_Z$ included in the multiband image represent values that are obtained by separating light emitted from the object Ob into tristimulus values X, Y, and Z in wavelength, and multiplying the tristimulus values X, Y, and Z by a spectral sensitivity of the light receiving element array 4. The spectral sensitivity of the light receiving element array 4 is already known at the time of design; therefore, by dividing the above described output value by the spectral sensitivity of the light receiving element array 4, it is possible to obtain the tristimulus values X, Y, and Z of the light emitted from the object Ob. Further, it is possible to detect the color of the object Ob (a color specification value in the XYZ color space) from the tristimulus values X, Y, and Z. At this time, each of the spectral images $SP_X$, $SP_Y$, and $SP_Z$ is a two-dimensional image corresponding to the light field image LF acquired by the sensor 30; therefore, it is possible to simultaneously detect colors of the object Ob at respective positions of the two-dimensional coordinates by using the spectral images $SP_X$, $SP_Y$, and $SP_Z$.

Figure 11:
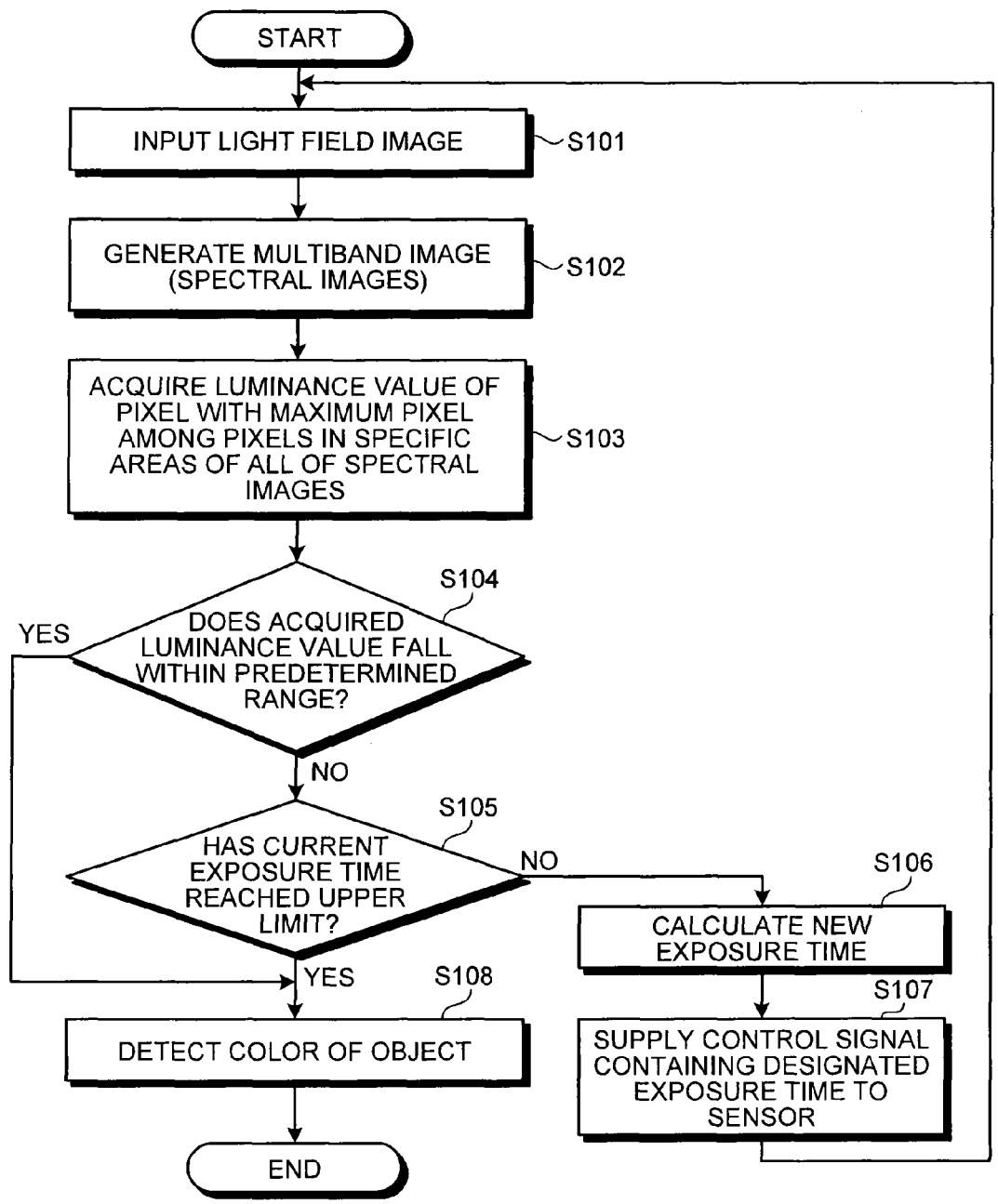
FIG. 11 is a flowchart illustrating an example of the flow of processing performed by the arithmetic processor.

An example of the flow of processing performed by the arithmetic processor 40 will be described below with reference to FIG. 11. FIG. 11 is a flowchart illustrating an example of the flow of the processing performed by the arithmetic processor 40.

The arithmetic processor 40 inputs a light field image LF captured by the sensor 30 (Step S101). The light field image LF input to the arithmetic processor 40 is temporarily stored in the frame memory 45 inside the arithmetic processor 40.

Subsequently, the spectral image generator 41 generates a multiband image including the spectral images $SP_X$, $SP_Y$, and $SP_Z$ respectively corresponding to the filter areas $F_X$, $F_Y$, and $F_Z$ of the filter 2 on the basis of the light field image LF temporarily stored in the frame memory 45 (Step S102).

Then, the exposure adjuster 42 acquires a luminance value of a pixel with the maximum luminance among the pixels in specific image areas (specific areas) $M_S$ of all of the spectral images $SP_X$, $SP_Y$, and $SP_Z$ included in the multiband image generated at Step S102 (Step S103). The exposure adjuster 42 determines whether the luminance value acquired at Step S103 falls within a predetermined range (for example, 80% to 90% of the saturation value) (Step S104).

As a result of the determination at Step S104, if the luminance value acquired at Step S103 falls within the predetermined range (YES at Step S104), the processing proceeds to Step S108. If the luminance value does not fall within the predetermined range (NO at Step S104), the processing proceeds to Step S105.

At Step S105, the exposure adjuster 42 determines whether a current exposure time Current Extime has reached a predetermined upper limit of the exposure time. If the current exposure time Current Extime has reached the upper limit (YES at Step S105), the processing proceeds to Step S108. If the current exposure time Current Extime has not reached the upper limit (NO at Step S105), the processing proceeds to Step S106.

At Step S106, the exposure adjuster 42 calculates a new exposure time New Extime by Equation (1) as described above. The sensor drive controller 43 supplies the new exposure time New Extime calculated at Step S106 to the sensor 30 (Step S107). Therefore, the sensor 30 captures a new light field image LF based on the new exposure time New Extime. Thereafter, the processing returns to Step S101 and subsequent steps are repeated.

In contrast, at Step S108, the color detector 44 detects a color of the object Ob by using the multiband image received from the exposure adjuster 42. When the color detector 44 completes the detection of the color of the object Ob, a series of the processing illustrated in the flowchart in FIG. 11 is terminated.

The above processing performed by each of the units of the arithmetic processor 40 are described by way of example only, and are not limited to this example.

For example, while the specific image area $M_S$ for evaluating the luminance value of the spectral image SP is determined in advance as an area as illustrated in FIG. 10 in the above described example, it may be possible to set the specific image area $M_S$ in accordance with user operation. In this case, for example, the imaging device 10 may be provided with an interface (operation receiver) that receives user operation for designating an area in an image, and may be configured to, when a user performs operation of designating an area through the interface, set the designated area as the specific image area $M_S$ and evaluate a luminance value. Further, when a user performs operation of designating the entire area of the spectral image SP, it may be possible to evaluate a luminance value by using the entire area of the spectral image SP as a target.

Further, while the predetermined range used to determine the luminance value of the spectral image SP is set to a range of 80% to 90% of the saturation value in the above described example, the predetermined range may be changed in an arbitrary manner. For example, when the luminance value is evaluated by using the entire area of the spectral image SP as a target, it may be possible to use a range of equal to or higher than 80% of the saturation value and lower than the saturation value as the predetermined range. Furthermore, it may be possible to allow a user to arbitrarily set the predetermined range depending on a type of the object Ob.

Moreover, while a pixel with the maximum luminance among the three channels is selected and the exposure time is adjusted such that the luminance value falls within the predetermined range in the above described example, it may be possible to select a pixel for each of the channels (each of the spectral images SP), and adjust the exposure time for each of the channels such that the luminance value fall within the predetermined range. In this case, for example, imaging is repeated the same number of times as the channels with the exposure time adjusted for each of the channels, and the spectral image SP, in which the exposure time is appropriately adjusted, is individually generated from each of the light field images LF. More specifically, imaging is performed with an exposure time that is adjusted such that a luminance value of a pixel selected from the spectral image $SP_X$ falls within a predetermined range, and the spectral image $SP_X$ is generated from the light field image LF obtained by the imaging. Further, imaging is performed with an exposure time that is adjusted such that a luminance value of a pixel selected from the spectral image $SP_Y$ falls within a predetermined range, and the spectral image $SP_Y$ is generated from the light field image LF obtained by the imaging. Furthermore, imaging is performed with an exposure time that is adjusted such that a luminance value of a pixel selected from the spectral image $SP_Z$ falls within a predetermined range, and the spectral image $SP_Z$ is generated from the light field image LF obtained by the imaging. Then, the spectral images SP individually generated as described above are corrected in accordance with a difference in the exposure time adjusted for each of the channels, and are used to detect a color of the object Ob. Examples of the method of correcting the spectral images SP in accordance with a difference in the exposure time include a method of multiplying a pixel value of the spectral image SP of each of the channels by a value proportional to a reciprocal of the exposure time adjusted for each of the channels. Consequently, it is possible to obtain the spectral images SP in which a variation in an intensity ratio of the three channels due to a difference in the exposure time is corrected, so that it is possible to appropriately detect the color of the object Ob.

Figure 12:
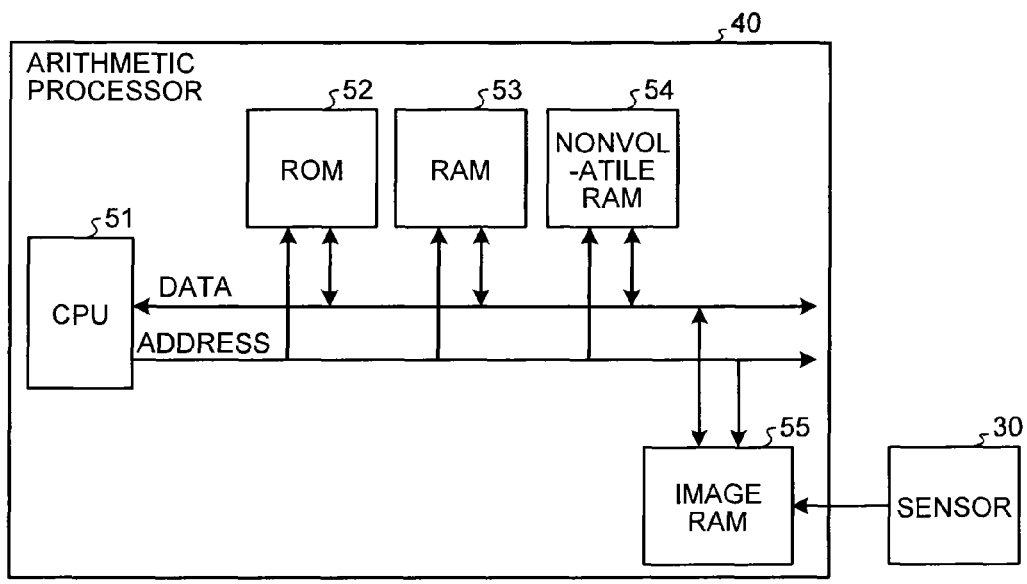
FIG. 12 is a block diagram illustrating an example of a hardware configuration of the arithmetic processor.

FIG. 12 is a diagram illustrating an example of a hardware configuration of the arithmetic processor 40. The arithmetic processor 40 includes, as illustrated in FIG. 12 for example, a central processing unit (CPU) 51 that performs arithmetic processing, a read only memory (ROM) 52 that stores therein programs for operating the CPU 51, a random access memory (RAM) 53 used as a working memory when the CPU 51 executes the programs, a nonvolatile RAM 54 that stores therein data for various calculations, and an image RAM 55 that temporarily stores therein image data from the sensor 30.

The processing functions (the spectral image generator 41, the exposure adjuster 42, the sensor drive controller 43, and the color detector 44) of the arithmetic processor 40 illustrated in FIG. 7 are implemented by causing the CPU 51 to read a program stored in the ROM 52 and execute the program, for example. In this case, the program for implementing the above described units is provided by being stored in the ROM 52 in advance, for example. The program has a module structure including the processing functions of the arithmetic processor 40, and when the CPU 51 reads the program from the RAM 53 and executes the program, the above described units (the spectral image generator 41, the exposure adjuster 42, the sensor drive controller 43, and the color detector 44) are generated on the RAM 53.

A method of providing the program is not limited to the above described example. For example, it may be possible to employ a method of storing the program in an external apparatus connected to a network, such as the Internet, and causing the imaging device 10 to download the program via the network. Further, it may be possible to employ a method of storing the above described program in a recording medium that can be read by the imaging device 10 in a computer-installable or a computer-executable file.

A part or all of the above described processing functions of the arithmetic processor 40 may be realized by using dedicated hardware, such as an application specific integrated circuit (ASIC) or a field-programmable gate array (FPGA).

As explained in detail with specific examples so far, the imaging device 10 of the embodiment adjusts the exposure time of the light receiving element array 4 on the basis of the luminance value of the spectral image SP; therefore, it is possible to appropriately adjust the exposure time of the light receiving element array 4 so as to obtain a preferred spectral image SP. Further, it is possible to detect a color of the object Ob with high accuracy by using the preferred spectral image SP that is obtained by appropriately adjusting the exposure time.

The embodiment may be understood as described below. Specifically, the imaging device 10 of the embodiment includes: the filter 2 including the filter areas $F_X$, $F_Y$, and $F_Z$ having different spectral transmission characteristics; the light receiving element array 4 that receives light transmitted through the filter 2 and outputs image information; the microlens array 3 that includes a plurality of lenses arranged approximately parallel to a light receiving surface of the light receiving element array 4 and that is arranged between the filter 2 and the light receiving element array 4; the spectral image generator 41 that generates the spectral images $SP_X$, $SP_Y$, and $SP_Z$ corresponding to the respective filter areas $F_X$, $F_Y$, and $F_Z$ on the basis of the image information output by the light receiving element array 4; and the exposure adjuster 42 that adjusts an exposure time of the light receiving element array 4 on the basis of luminance values of the spectral images $SP_X$, $SP_Y$, and $SP_Z$.

Figure 13:
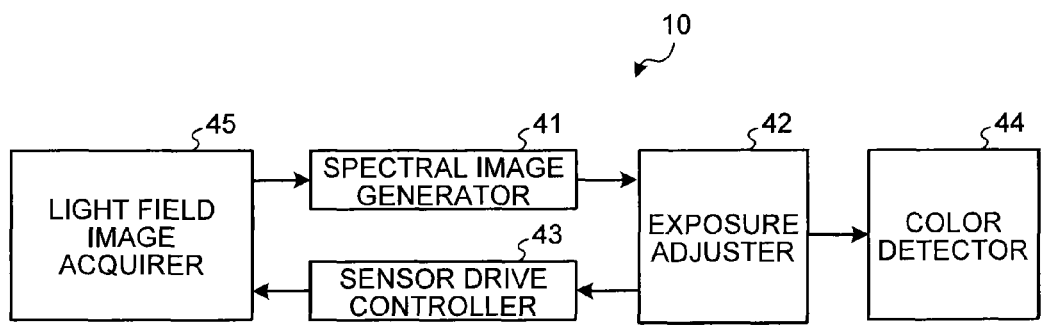
FIG. 13 is a block diagram illustrating an example of a functional configuration of the imaging device of the embodiment.

FIG. 13 is a block diagram illustrating an example of a functional configuration of the imaging device 10 of the embodiment. As illustrated in FIG. 13, the imaging device 10 of the embodiment may be understood as a structure that includes a light field image acquiring unit 60, the spectral image generator 41, the exposure adjuster 42, the sensor drive controller 43, and the color detector 44.

The light field image acquiring unit 60 is a functional component implemented by the lens module 20 and the sensor 30 as described above. The light field image acquiring unit 60 splits light incident on the main lens 1 into light beams by the filter 2, and receives the light beams at different positions of the light receiving element array 4 through the microlens array 3, thereby obtaining a light field image. In this case, the exposure time of the light receiving element array 4 is controlled in accordance with a control signal supplied from the sensor drive controller 43. The light field image acquired by the light field image acquiring unit 60 is sent to the spectral image generator 41, and the spectral image generator 41 generates spectral images from the light field image.

The exposure adjuster 42 acquires a luminance value of a pixel with the maximum luminance among pixels in specific areas of the spectral images generated by the spectral image generator 41, and determines whether the acquired luminance value falls within a predetermined range. As a result of the determination, if the acquired luminance value falls within the predetermined range, the spectral images generated by the spectral image generator 41 are output to the color detector 44 and color detection is performed. In contrast, if the acquired luminance value does not fall within the predetermined range, a new exposure time is calculated based on the acquired luminance value, and the new exposure time is output to the sensor drive controller 43. When the exposure adjuster 42 calculates the new exposure time, the sensor drive controller 43 supplies a control signal containing the new exposure time to the light field image acquiring unit 60. Consequently, the exposure time of the light receiving element array 4 is optimized such that a preferred spectral image can be obtained.

While the embodiment has been explained in detail above as one example of application of the present invention, the present invention is not limited to the embodiment as it is, and may be embodied with various modifications or changes within the scope of the invention. For example, while the number of divided areas of the filter 2 is three in the above described embodiment, it is sufficient that the filter 2 has different spectral transmittances in accordance with positions, and the number of divided areas may be set to an arbitrary number depending on the purpose. Further, the filter 2 may be configured such that the spectral transmission characteristics continuously vary without specific boundaries between areas. In this case, it is sufficient that the positions of mezzo pixels in a macro pixel corresponding to each of the channels of a multiband value are determined in advance in accordance with positions in the filter corresponding to desired spectral transmission characteristics.

According to an embodiment of the present invention, it is possible to appropriately adjust an exposure time of an imaging element such that a preferred spectral image can be obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging device comprising:
   a filter that includes a plurality of filter areas having different spectral transmission characteristics;
   an imaging element to receive light transmitted through the filter and output image information;
   a lens array that includes a plurality of lenses arranged approximately parallel to a light receiving surface of the imaging element and that is arranged between the filter and the imaging element;
   a spectral image generator to generate a plurality of spectral images respectively corresponding to the plurality of filter areas on the basis of the image information output by the imaging element; and
   an exposure adjuster to adjust an exposure time of the imaging element on the basis of luminance values of the spectral images.

2. The imaging device according to claim 1, wherein the exposure adjuster adjusts the exposure time such that a maximum value of the luminance values of the spectral images falls within a predetermined range.

3. The imaging device according to claim 1, wherein the exposure adjuster adjusts the exposure time for each of the spectral images such that a maximum value of the luminance value of the spectral image falls within a predetermined range.

4. The imaging device according to claim 2, wherein the predetermined range is a range of equal to or higher than 80 percent of a saturation value and equal to or lower than 90 percent of the saturation value, wherein the saturation value corresponds to a saturation sensitivity of the imaging element.

5. The imaging device according to claim 2, wherein when the maximum value is below the predetermined range, and if the maximum value does not fall within the predetermined range even when the exposure time is increased to a predetermined upper limit, the exposure adjuster terminates an adjustment of the exposure time.

6. The imaging device according to claim 4, wherein when the maximum value is below the predetermined range, and if the maximum value does not fall within the predetermined range even when the exposure time is increased to a predetermined upper limit, the exposure adjuster terminates an adjustment of the exposure time.

7. The imaging device according to claim 1, wherein the exposure adjuster adjusts the exposure time on the basis of a luminance value of a specific image area in each of the spectral images.

8. The imaging device according to claim 2, wherein the exposure adjuster adjusts the exposure time on the basis of a luminance value of a specific image area in each of the spectral images.

9. The imaging device according to claim 4, wherein the exposure adjuster adjusts the exposure time on the basis of a luminance value of a specific image area in each of the spectral images.

10. The imaging device according to claim 7, further comprising:
    an operation receiver to receive user operation, wherein when the operation receiver receives user operation of designating the specific image area, the exposure adjuster adjusts the exposure time on the basis of a luminance value of the designated specific image area.

11. The imaging device according to claim 8, further comprising:
    an operation receiver to receive user operation, wherein when the operation receiver receives user operation of designating the specific image area, the exposure adjuster adjusts the exposure time on the basis of a luminance value of the designated specific image area.

12. The imaging device according to claim 1, wherein when at least one of pieces of pixel information of pixels constituting a single pixel of the spectral images among pieces of pixel information contained in the image information output by the imaging element is saturated, the spectral image generator generates the spectral images such that the at least one of pixel is in a saturated state in the spectral images.

13. The imaging device according to claim 2, wherein when at least one of pieces of pixel information of pixels constituting a single pixel of the spectral images among pieces of pixel information contained in the image information output by the imaging element is saturated, the spectral image generator generates the spectral images such that the at least one of pixel is in a saturated state in the spectral images.

14. The imaging device according to claim 3, wherein when at least one of pieces of pixel information of pixels constituting a single pixel of the spectral images among pieces of pixel information contained in the image information output by the imaging element is saturated, the spectral image generator generates the spectral images such that the at least one of pixel is in a saturated state in the spectral images.

15. The imaging device according to claim 4, wherein when at least one of pieces of pixel information of pixels constituting a single pixel of the spectral images among pieces of pixel information contained in the image information output by the imaging element is saturated, the spectral image generator generates the spectral images such that the at least one of pixel is in a saturated state in the spectral images.

16. The imaging device according to claim 5, wherein when at least one of pieces of pixel information of pixels constituting a single pixel of the spectral images among pieces of pixel information contained in the image information output by the imaging element is saturated, the spectral image generator generates the spectral images such that the at least one of pixel is in a saturated state in the spectral images.

17. The imaging device according to claim 6, wherein when at least one of pieces of pixel information of pixels constituting a single pixel of the spectral images among pieces of pixel information contained in the image information output by the imaging element is saturated, the spectral image generator generates the spectral images such that the at least one of pixel is in a saturated state in the spectral images.

18. The imaging device according to claim 7, wherein when at least one of pieces of pixel information of pixels constituting a single pixel of the spectral images among pieces of pixel information contained in the image information output by the imaging element is saturated, the spectral image generator generates the spectral images such that the at least one of pixel is in a saturated state in the spectral images.

19. The imaging device according to claim 10, wherein when at least one of pieces of pixel information of pixels constituting a single pixel of the spectral images among pieces of pixel information contained in the image information output by the imaging element is saturated, the spectral image generator generates the spectral images such that the at least one of pixel is in a saturated state in the spectral images.

20. An exposure adjusting method implemented by an imaging device that includes:
   a filter that includes a plurality of filter areas having different spectral transmission characteristics;
   an imaging element to receive light transmitted through the filter and output image information; and
   a lens array that includes a plurality of lenses arranged approximately parallel to a light receiving surface of the imaging element and that is arranged between the filter and the imaging element,
   the exposure adjusting method comprising:
   generating a plurality of spectral images respectively corresponding to the plurality of filter areas on the basis of the image information output by the imaging element; and
   adjusting an exposure time of the imaging element on the basis of luminance values of the spectral images.

* * * * *